US012338933B1

(12) United States Patent
Gerwitz

(10) Patent No.: US 12,338,933 B1
(45) Date of Patent: Jun. 24, 2025

(54) ATTACHMENT SYSTEM FOR A POWER AIR BLOWER

(71) Applicant: Jeffrey Eric Gerwitz, Arden, NC (US)

(72) Inventor: Jeffrey Eric Gerwitz, Arden, NC (US)

(*) Notice: Subject to any disclaimer, the term of this patent is extended or adjusted under 35 U.S.C. 154(b) by 0 days.

(21) Appl. No.: 18/127,460

(22) Filed: Mar. 28, 2023

Related U.S. Application Data

(60) Provisional application No. 63/325,175, filed on Mar. 30, 2022.

(51) Int. Cl.
*F16L 43/00* (2006.01)
*A01G 20/47* (2018.01)
*F16L 27/12* (2006.01)

(52) U.S. Cl.
CPC ............ *F16L 43/008* (2013.01); *A01G 20/47* (2018.02); *F16L 27/12* (2013.01)

(58) Field of Classification Search
CPC ....... F16L 43/008; F16L 27/12; F16L 27/127; F16L 27/1273; A01G 20/47; A47L 5/12; A47L 5/14
USPC ................................................. 285/303, 302
See application file for complete search history.

(56) References Cited

U.S. PATENT DOCUMENTS

| 4,884,314 | A | * | 12/1989 | Miner | A01G 20/47 15/419 |
| 5,054,159 | A | * | 10/1991 | Richardson | A47L 5/14 15/393 |
| 5,333,787 | A | * | 8/1994 | Smith | B05B 3/16 239/233 |
| D382,683 | S | | 8/1997 | Henke et al. | |
| 5,652,995 | A | * | 8/1997 | Henke | A47L 9/08 15/415.1 |
| 5,813,088 | A | | 8/1998 | Wagner et al. | |
| 5,926,910 | A | | 7/1999 | Nishimura et al. | |
| 5,950,276 | A | | 9/1999 | Everts et al. | |
| 5,991,973 | A | * | 11/1999 | Simpson | A47L 9/0673 15/344 |
| 6,076,231 | A | | 6/2000 | Bucher | |
| 6,125,503 | A | * | 10/2000 | Callahan | A47L 5/14 15/327.5 |
| 6,185,918 | B1 | * | 2/2001 | Nelson | A01G 20/47 56/12.9 |
| 7,814,615 | B1 | | 10/2010 | Ries | |
| 7,823,303 | B2 | | 11/2010 | Nagamatsu et al. | |
| 8,555,463 | B1 | * | 10/2013 | Laube | A01K 13/002 119/606 |
| 8,739,362 | B1 | | 6/2014 | Conder | |

(Continued)

*Primary Examiner* — David Bochna
(74) *Attorney, Agent, or Firm* — John Rizvi; John Rizvi, P.A.—The Patent Professor ®

(57) ABSTRACT

An attachment system for a power air blower is disclosed. The attachment system is made to be universally adaptable, connectable, or retrofittable to a wide variety of existing blowers. The attachment system includes an elongated tube and a bent or curved tube. The elongated tube attaches, at one end, to an air outlet of a power air blower and, at the other end, to an air inlet end of the bent or curved tube, which includes a nozzle at the opposite end. The elongated tube and the bent or curved tube cooperate with each other, such as telescopically, so that the attachment system is length-adjustable and the separation between the nozzle and the power air blower is adjustable. The attachment system includes one or more light emitters configured to illuminate an area adjacent to the nozzle.

14 Claims, 7 Drawing Sheets

(56) References Cited

U.S. PATENT DOCUMENTS

| | | |
|---|---|---|
| 8,984,710 B2 | 3/2015 | Yokoyama |
| 9,332,694 B2 | 5/2016 | Prager |
| 9,510,516 B2 | 12/2016 | Shumaker et al. |
| 9,883,634 B2 | 2/2018 | Romito |
| 10,813,300 B2 | 10/2020 | Smyers |
| 10,966,378 B2 | 4/2021 | Kuckuck et al. |
| 2005/0133354 A1* | 6/2005 | Watanabe ............... A47L 5/14 200/334 |
| 2008/0163450 A1 | 7/2008 | Disanto |
| 2012/0073080 A1* | 3/2012 | Yokoyama ............ A01G 20/47 285/332 |
| 2013/0017079 A1* | 1/2013 | Armstrong ............. A47L 5/14 415/204 |
| 2013/0247327 A1* | 9/2013 | Domingo .............. A01G 20/47 15/324 |
| 2013/0298345 A1* | 11/2013 | Romito ................. A01G 20/47 15/246 |
| 2013/0298351 A1 | 11/2013 | Romito |
| 2014/0068892 A1 | 3/2014 | Chambers |
| 2015/0107050 A1* | 4/2015 | Reynolds ........... E04D 13/0765 15/414 |
| 2015/0237808 A1* | 8/2015 | Prager ................. E01H 1/0809 15/405 |
| 2015/0373922 A1* | 12/2015 | Romito ................. A01G 20/47 15/405 |
| 2016/0108924 A1 | 4/2016 | Conrad et al. |
| 2019/0344724 A1 | 11/2019 | Shumaker et al. |
| 2020/0149668 A1* | 5/2020 | Mason ................... F16L 33/06 |
| 2020/0397201 A1* | 12/2020 | Price ..................... A47L 9/1427 |
| 2021/0007294 A1* | 1/2021 | Righi ..................... A01G 20/47 |
| 2022/0201946 A1* | 6/2022 | Cholst ................... F04D 29/545 |
| 2022/0235554 A1* | 7/2022 | Lindl ...................... A47L 9/327 |
| 2023/0122554 A1* | 4/2023 | Williams ................ A01D 7/00 56/400.01 |
| 2023/0257947 A1* | 8/2023 | Price ..................... A01G 20/47 15/344 |

\* cited by examiner

ATTACHMENT SYSTEM FOR A POWER AIR BLOWER

CROSS-REFERENCE TO RELATED APPLICATION

This application claims the benefit of U.S. Provisional Patent Application No. 63/325,175, filed on Mar. 30, 2022, which is incorporated herein by reference in its entirety.

FIELD OF THE INVENTION

The present invention relates generally to an attachment system for a power air blower, and more particularly, to an attachment system for a power air blower for moving and clearing debris such as leaves.

BACKGROUND OF THE INVENTION

Power air blowers are commonly used for landscape cleanup in both commercial and private residential settings as well as in public areas. These power air blowers are sufficiently small and lightweight as to be portable. In most cases, a small electric or gasoline/oil motor constitutes a key component of the blower's power unit, which may be connected to an elongated tubular extension that can be held and moved by the operator to direct a forceful flow or stream of air towards the surface to be cleared of debris. The power unit of some of these portable blowers may be designed to be carried on the back of the operator in a manner similar to how a backpack may be worn over one's back, while in some other models, the power unit can be carried by hand.

The elongated tubular extension may be provided with a nozzle piece, usually made of lightweight plastic, that may be slidably received on one end of the tubular extension. The nozzle usually terminates with an opening that can have, e.g., a generally circular cross-sectional shape.

A common problem with existing power air blowers is that the length of the tubular extension and nozzle piece may not be easily adjustable depending on the height and size of an operator. The operator must frequently bend his or her back in an uncomfortable position during the course of performing a task. Furthermore, another problem in some existing blowers is that the elevation and orientation of the outlet nozzle relative to the ground surface may be such that effective and less tiresome clearing of debris such as leaves may not be as easy as would be desired.

The general idea of implementing adjustable length mechanisms or adjustable outlet angles has been disclosed previously. For example, an air blower attachment system for cleaning gutters has been disclosed in which a telescoping extension member adjusts the length.

Another prior attachment system includes a distal tube coupled to a proximal tube, wherein the distal tube is telescopically coupled to the proximal tube. The distal tube has a retracted position within the proximal tube and an alternate extended position. A clamp means is coupled to the proximal tube and is selectively engageable with the distal tube to prevent the distal tube from moving between the retracted position and the alternate extended position.

Also, attachments for air blowers in which the nozzle portion may be configured at various angles have been proposed. One example of such an attachment includes an actuating sleeve configured to adjust the nozzle portion of the attachment at various angles relative to the longitudinal axis of a cylindrical portion of the attachment when the operator rotates the actuating sleeve.

Another prior blower attachment system has a flexible tubing connection as well as a lower angular directing member. The lower member is generally designed for blowing air upwards as opposed to parallel to the ground, primarily for the purpose of blowing debris under hard-to-reach areas of machines such as under lawnmowers.

Another prior attachment assembly includes a nozzle that is insertable into an elbow section in a moveable back and forth motion of at least 180° for aiding the operator in the movement and removal of debris.

In view of the foregoing, there still remains a need in the art to provide a versatile attachment system for a power air blower in which the length of the attachment system can be easily adjusted to an operator's height and size such that any need for bending of the operator's back during the blower's use may be eliminated or reduced.

There also remains a need in the art to provide a versatile attachment system for a power air blower in which the positioning of the air outlet nozzle can be adjusted to an optimum height above the ground surface.

There also remains a need in the art to provide a versatile attachment system for a power air blower in which the air outlet nozzle can be oriented at an optimum angle relative to the ground surface to permit an efficient movement and removal of debris.

One or more of the foregoing needs, as well as other needs, may be fulfilled by the invention described below.

SUMMARY OF THE INVENTION

The present invention is directed to an attachment system for a power air blower. The attachment system may be made to be universally adaptable or connectable, and, therefore, can be retrofitted to a wide variety of blowers. For example, the attachment system may be comprised in or mounted to a backpack-style power air blower, a power air blower configured to be carried using a shoulder strap, or a power air blower configured to include a belt loop to help carry a blower and direct its air flow. The attachment system comprises (i) an elongated tube and (ii) a bent or curved tube assembly with an inlet end and a terminal end provided with an air outlet nozzle configured to disperse a stream of air, wherein the elongated tube may be configured to attach, at one end, to an air outlet of a power (motor) unit of a blower and, at the other end, to the inlet end of the bent or curved tube assembly. The elongated tube and the bent or curved tube assembly may be configured to cooperate with each other such that the attachment system can be made selectively extendable to, and lockable at, a particular length. Thus, in addition to universal adaptability, the attachment system of the present invention can accommodate a wide range of operator heights and sizes, while allowing the air outlet nozzle to be positioned at an optimum elevation above the ground surface and at an optimum angular orientation relative to the ground surface. These features eliminate or reduce the need for the operator to bend his or her back while operating the blower. In some embodiments, the attachment system may include a light-emitting device to enable operation of the blower under reduced lighting conditions.

In a first implementation of the invention, an attachment system for a power air blower can comprise: (i) an elongated tube with an inlet end and an outlet end, and (ii) a bent or curved tube assembly with an inlet end and a terminal end provided with an air outlet nozzle configured to direct a stream of air, wherein the inlet end of the elongated tube is configured to attach to an air outlet of a power (motor) unit of a blower and the outlet end is configured to attach to the inlet end of the bent or curved tube assembly, and wherein the elongated tube and the bent or curved tube assembly are configured to cooperate with each other such that the attachment system can be made selectively extendable to, and lockable at, a particular length based on the height of the operator and the optimum elevation and angular orientation of the air outlet nozzle relative to the ground surface.

In a second implementation of the invention, the inlet end of the elongated tube is attached to the air outlet at the power unit of the blower by means of an adjustable pipe clamp.

In another implementation of the invention, the elongated tube can be configured to receive and lock into place a length selected from multiple preset lengths of the bent or curved tube assembly.

In another implementation of the invention, the bent or curved tube assembly can be configured to receive and lock into place a length selected from multiple preset lengths of the elongated tube.

In another implementation of the invention, the locking between the elongated tube and the bent or curved tube assembly may be facilitated by a series of protrusions disposed at preset lengths on the outer surface of the elongated tube and corresponding series of indentations disposed at preset lengths on the inner surface of the bent or curved tube assembly.

In another implementation of the invention, the locking between the elongated tube and the bent or curved tube assembly may be facilitated by a series of protrusions disposed at preset lengths on the outer surface of the bent or curved tube assembly and corresponding series of indentations disposed at preset lengths on the inner surface of the elongated tube.

In another implementation, the locking between the elongated tube and the bent or curved tube assembly is completed by means of a pipe clamp.

In another implementation of the invention, the elongated tube and/or bent or curved tube assembly may be expanded and/or contracted such that the air outlet nozzle is disposed at an elevation of from about ground level to about 3 inches above the ground surface, more preferably from about ground level to about 2 inches above the ground surface during operation of the blower.

In another implementation of the invention, the air outlet nozzle is configured such that it is adjustable to a directional orientation of about 15 degrees relative to the ground surface.

In another implementation of the invention, ribbing in the form of a serrated cross-sectional shape is provided at the bottom of the air outlet nozzle.

In another implementation of the invention, a light-emitting device (e.g., an LED light device) may be attached to one side of the air outlet nozzle.

In another implementation of the invention, the attachment system may be configured to be attached to a power unit of a backpack-style blower.

In another implementation of the invention, the attachment system may be configured to be attached to a power unit of a blower that can be carried using a shoulder strap.

In another implementation of the invention, the attachment system may be configured to be attached to a power unit of a blower that can be carried by hand.

In another implementation of the invention, the attachment system may be configured to be attached to a power unit of a blower that can be carried by a loop strap provided on a waist belt.

In another implementation of the invention, the elongated tube and the bent or curved tube can be rotatable relative to each other.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an attachment system for a power air blower and to a power air blower incorporating the same. The figures also depict the components that make up the attachment system.

Figure 1:
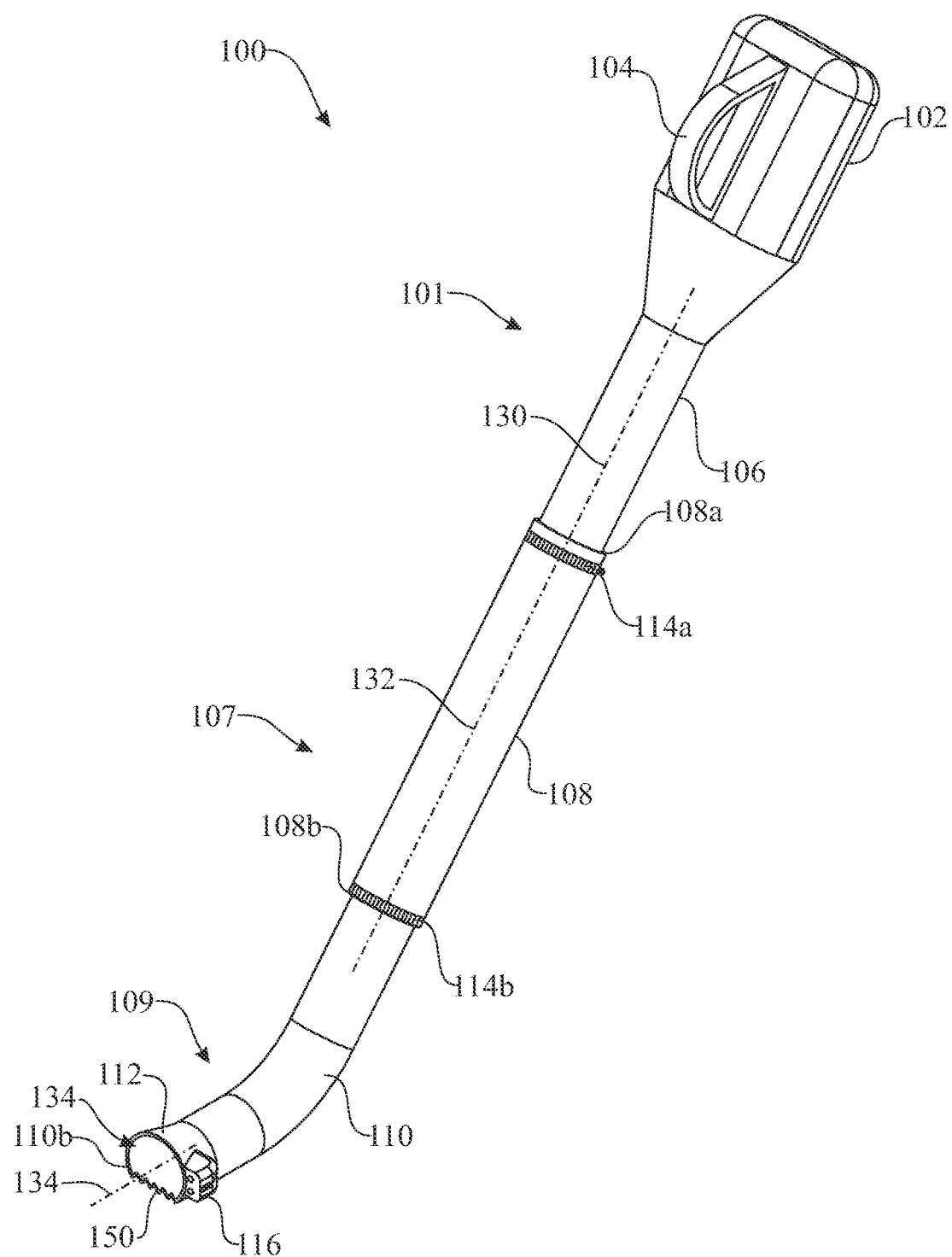
FIG. 1 presents a top, front isometric view of a power air blower fitted with an attachment system in accordance with a first illustrative embodiment of the present invention.
Figure 2:
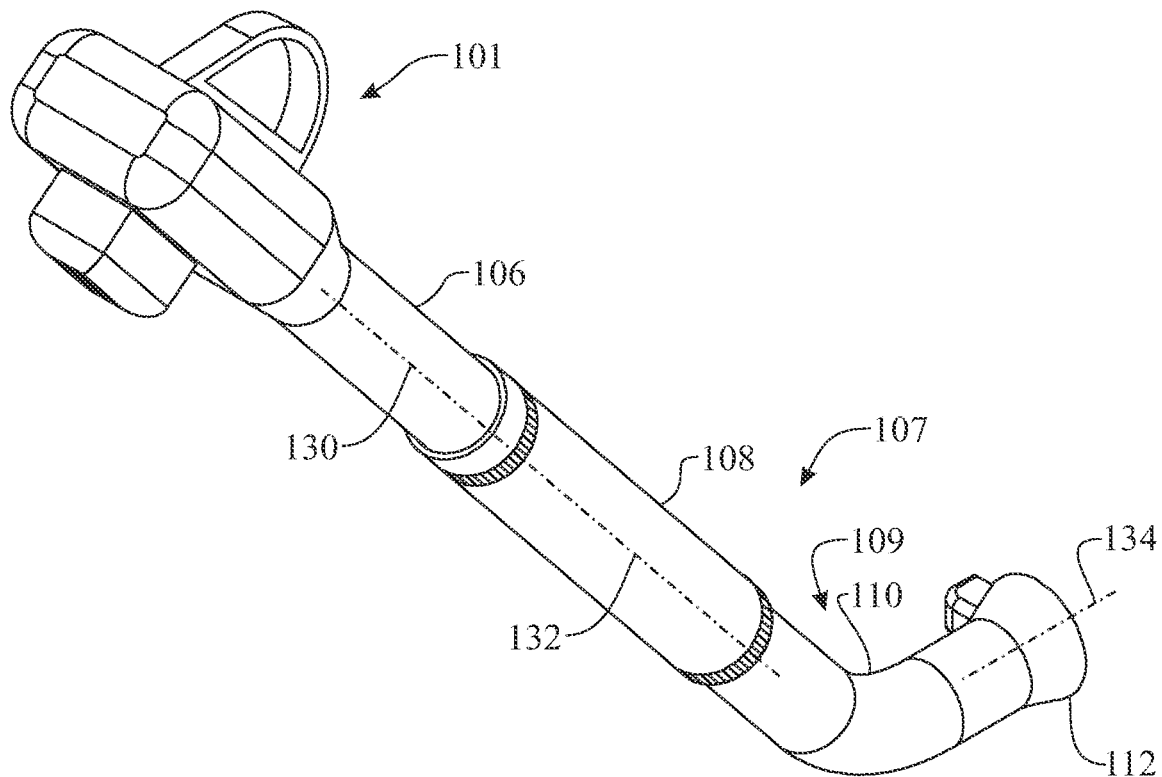
FIG. 2 presents a top, rear isometric view of the power air blower and an attachment system of FIG. 1.
Figure 6:
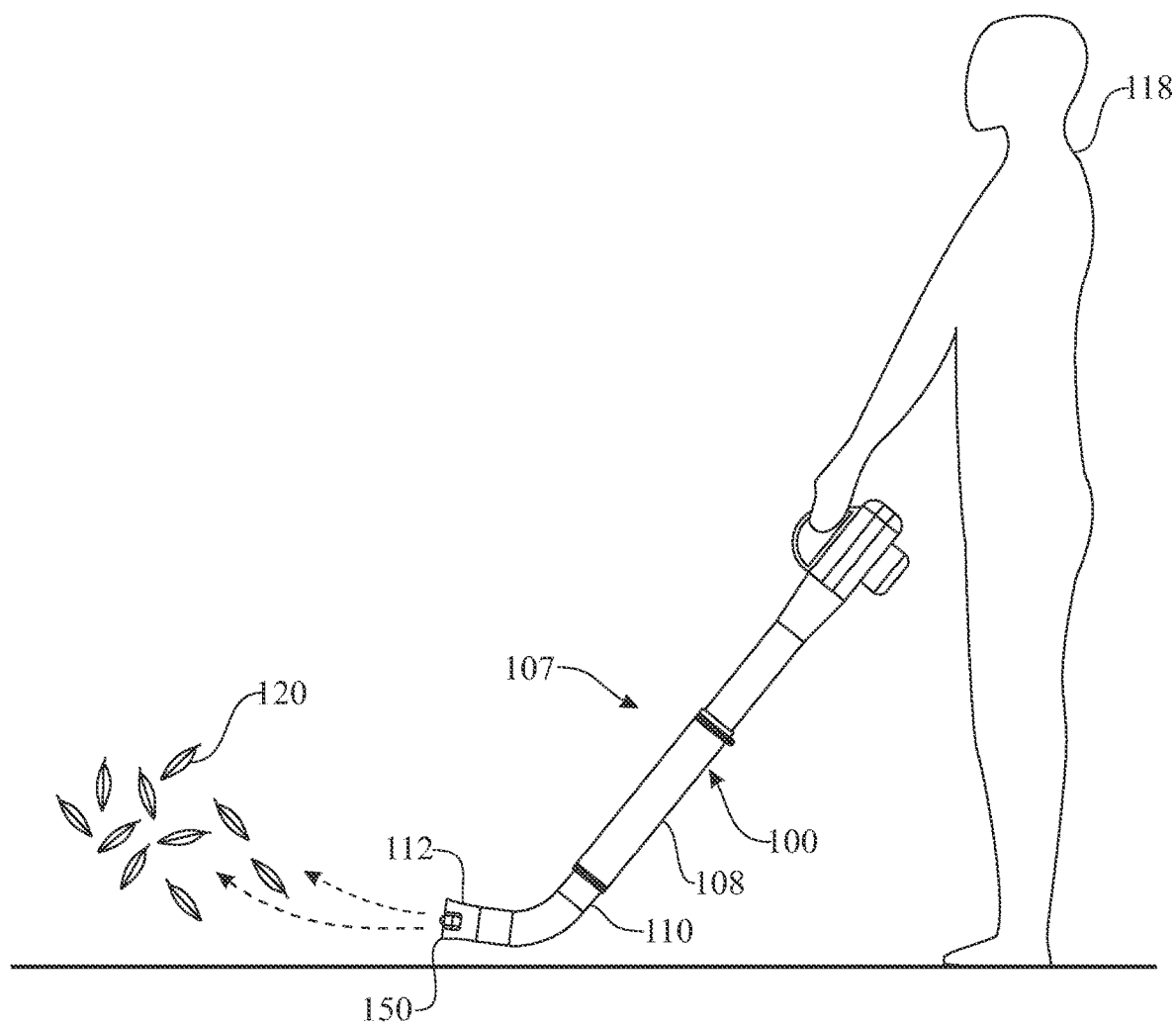
FIG. 6 presents a side elevation view of an operator holding and using a hand-held power air blower fitted with an attachment system in accordance with an illustrative embodiment of the present invention to blow debris from a ground surface.

Referring initially to FIG. 1, a power air blower 100 may be configured to be a hand-held blower that can include a power unit 101 and an attachment system 107. The power unit 101 may be comprised of a housing 102 containing an electric (battery or hard-wired) or fuel motor (not shown), a handle 104 that can be integrally provided on or separately mounted to the housing 102, and an air conduit or outlet 106. The attachment system 107 may be comprised of an elongated tube 108 and a bent or curved tube assembly 109 having a bent or curved tube portion 110 that terminates with a nozzle 112. The nozzle 112 ends in a distal, nozzle opening 136 and is designed to expel and direct a forceful flow or stream of air through the nozzle opening 136 to move and clear debris such as leaves 120, as depicted in FIG. 6. In some embodiments, the nozzle 112 may be shaped to have a flared end, with the nozzle opening 136 relatively larger than an opposite, proximal end of the nozzle 112, the flared end configured to widen the flow or stream of expelled air. In preferred embodiments, such as the present embodiment, the elongated tube 108 may be generally straight and formed along an axial direction 132. The axial direction 132 of the elongated tube 108 may be parallel to an axial direction 130 of the air outlet 106 of the power unit 101, as shown. In the present embodiment, for instance, the elongated tube 108 of the attachment system 107 is generally coaxial with the air outlet 106 of the power unit 101, such that the axial directions 130, 132 are generally the same.

The elongated tube 108 has an air inlet end 108a that mates with the air outlet 106 to provide a substantially air-tight fit, with fluid communication being allowed from the air outlet 106 of the power unit 101 to the elongated tube 108 of the attachment system 107 via the air inlet end 108a of the elongated tube 108. The elongated tube 108 can be made of a wide variety of materials (e.g., molded polymeric or plastic materials) that may have some degree of flexibility. In some embodiments, the bent or curved tube assembly 109 may be more rigid than the elongated tube 108. In some embodiments, as shown, a pipe clamp 114a may be used to connect the elongated tube 108 to the air outlet 106. However, other ways to provide a substantially air-tight fit are possible, such as a tight pressure compression fit aided by a built-in securement means such as a compression collar, threads, or the like. Although FIG. 1 shows the air outlet 106 and the air inlet end 108a of the elongated tube 108 to be in a male-female relationship, respectively, it is also within the scope of the present invention to switch the male-female relationship (i.e., configure the air inlet end 108a of the elongated tube 108 to be the male part and the air outlet 106 to be the female part), depending on the material of construction and configuration of the air outlet 106.

It should be understood that the connection or mating depth between the elongated tube 108 and the air outlet 106 may not only affect the degree of securement but also the overall length of the power air blower 100. Therefore, this variable should be taken into account in the telescopic expansion and contraction of the attachment system 107 described in further detail below.

Figure 4:
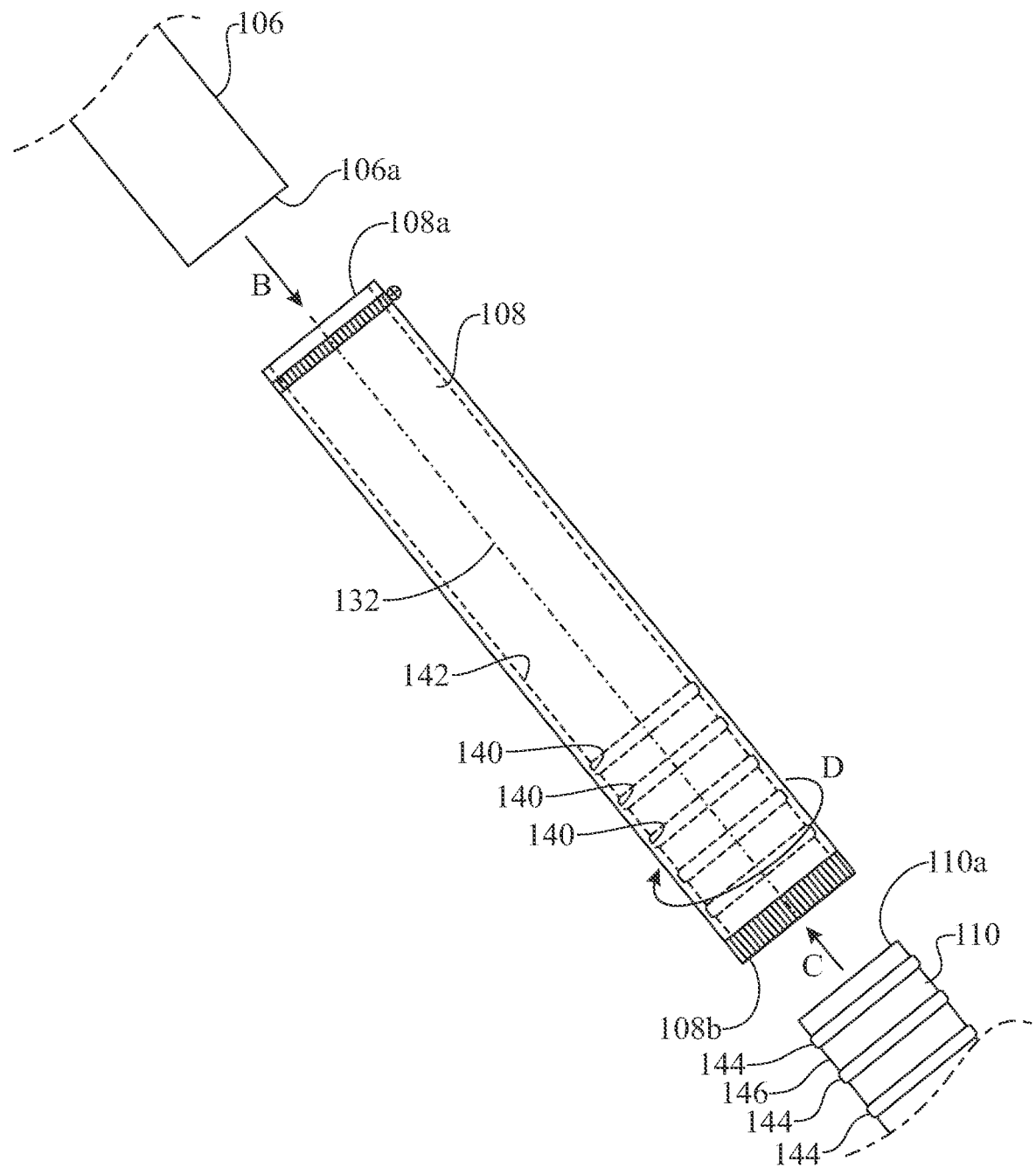
FIG. 4 presents an enlarged, partial exploded side elevation view of the attachment system of FIG. 1, illustrating the connection and motion of the elongated tube with respect to the bent or curved tube in some embodiments.

With continued reference to FIG. 1, the elongated tube 108 may have an air outlet end 108b opposite to the air inlet end 108a. The air outlet end 108b of the elongated tube 108 is mated in a male-female arrangement with an air inlet 110a (FIG. 4) of the bent or curved tube assembly 109, and more specifically, of the bent or curved tube portion 110 of the bent or curved tube assembly 109. The illustration of FIGS. 1 and 4 show the air inlet 110a of the bent or curved tube assembly 109 to be the male part and the air outlet end 108b of the elongated tube 108 to be the female part. Again, however, the male-female relationship can be switched in other embodiments (i.e., the air inlet 110a of the bent or curved tube assembly 109 can be the female part and the air outlet end 108b of the elongated tube 108 can be the male part).

The overall length of the attachment system 107 in accordance with the present invention can be made adjustable telescopically. In this way, the power air blower 100 can be held and used by operators having a wide range of heights and sizes. Therefore, this feature can eliminate or reduce the need for the operators to bend their backs during operation of the blower. The overall length adjustability feature also allows the elevation of the nozzle 112 relative to the ground surface to be optimized easily. In this regard, the nozzle 112 may be at ground level (e.g., when it is being used to scrape or break up wet leaves), and can also be optimally elevated to a height of up to about 3 inches, more preferably up to about 2 inches, from the ground surface. Furthermore, by adjusting the length of the attachment system 107, the user may more easily vary the angle of the attachment system 107 with respect to the ground surface and thereby adjust the angular orientation of the nozzle 112 relative to the ground surface.

Figure 3:
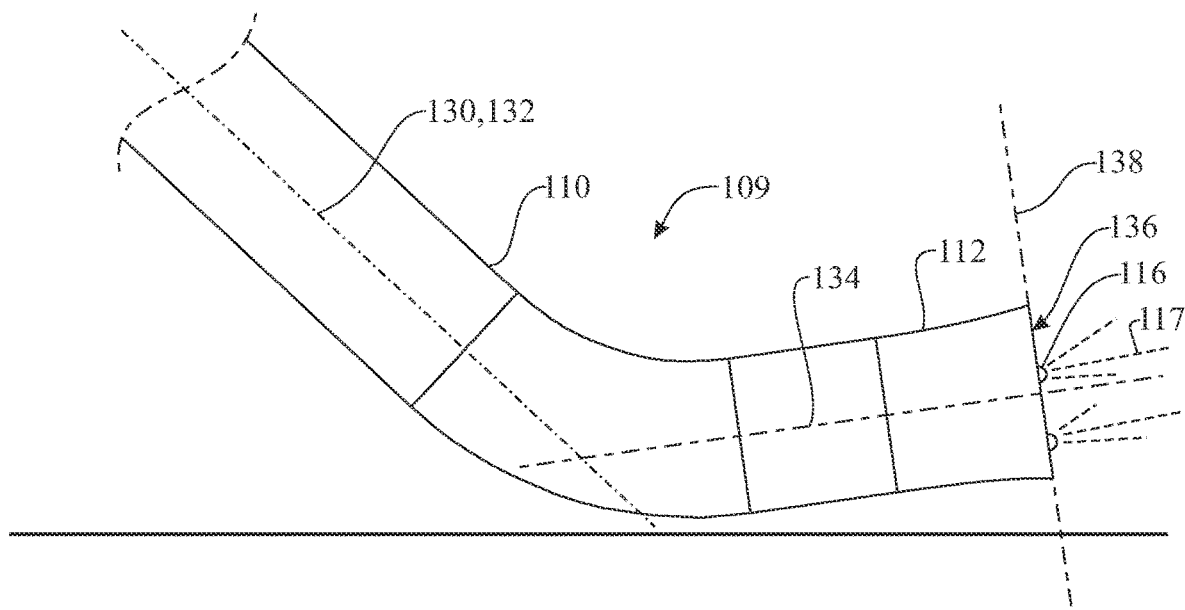
FIG. 3 presents an enlarged, partial side elevation view of a bent or curved tube assembly of the attachment system of FIG. 1, the bent or curved tube assembly provided with an air outlet nozzle in accordance with an illustrative embodiment of the present invention.

With reference to FIG. 3, as shown, the nozzle 112 is preferably formed along an axial direction 134. As shown, the axial direction 134 may be generally perpendicular to a plane 138 on which the nozzle opening 136 is formed or arranged. Furthermore, the axial direction 134 depicted herein forms an angle with the axial direction 132 of the elongated tube 108. More preferably, the axial direction 134 of the nozzle 112 may form an angle greater than 90 degrees and less than 180 degrees with, and thus may be oblique relative to, the axial direction 132 of the elongated tube 108. Such oblique orientation of the nozzle 112 relative to the elongated tube 108 (and thus relative to the air outlet 106 of the power unit 101) allows the operator to utilize the power air blower 100 in accordance with a preferred method of operation of the present invention, in which the nozzle 112 (i.e. the axial direction 134 thereof) is maintained forming an angle of about 15 degrees relative to the ground surface, as illustrated in FIG. 3. With this angular orientation, it is possible to move debris such as leaves up to 10 feet or more in a controlled and efficient manner.

The overall length adjustment of the attachment assembly 107 can be achieved by various ways. For example, as shown in FIG. 4, a series of indentations 140 spaced apart axially at predetermined intervals may be provided on the internal mating surface 142 of the elongated tube 108, which indentations are then engaged in a locking manner with a series of corresponding ribs or protrusions 144 spaced apart axially at the same predetermined intervals on the outer mating surface 146 of the bent or curved tube portion 110 of bent or curved tube assembly 109. In other embodiments, the series of indentations 140 can be provided on the mating surface 146 of the bent or curved tube portion 110 of the bent or curved tube assembly 109, and the series of ribs or protrusions 144 can be provided on the mating surface 142 of the elongated tube 108. Additionally, other length-adjusting mechanisms, such as a compression collar, may be used. Furthermore, as stated previously, the male-female roles of the elongated tube 108 and the bent or curved tube assembly 109 may be reversed.

In some embodiments, the number and spacing of the ribs or protrusions 144 and corresponding indentations 140 can be used to determine the range of suitable operator heights and sizes.

Figure 7:
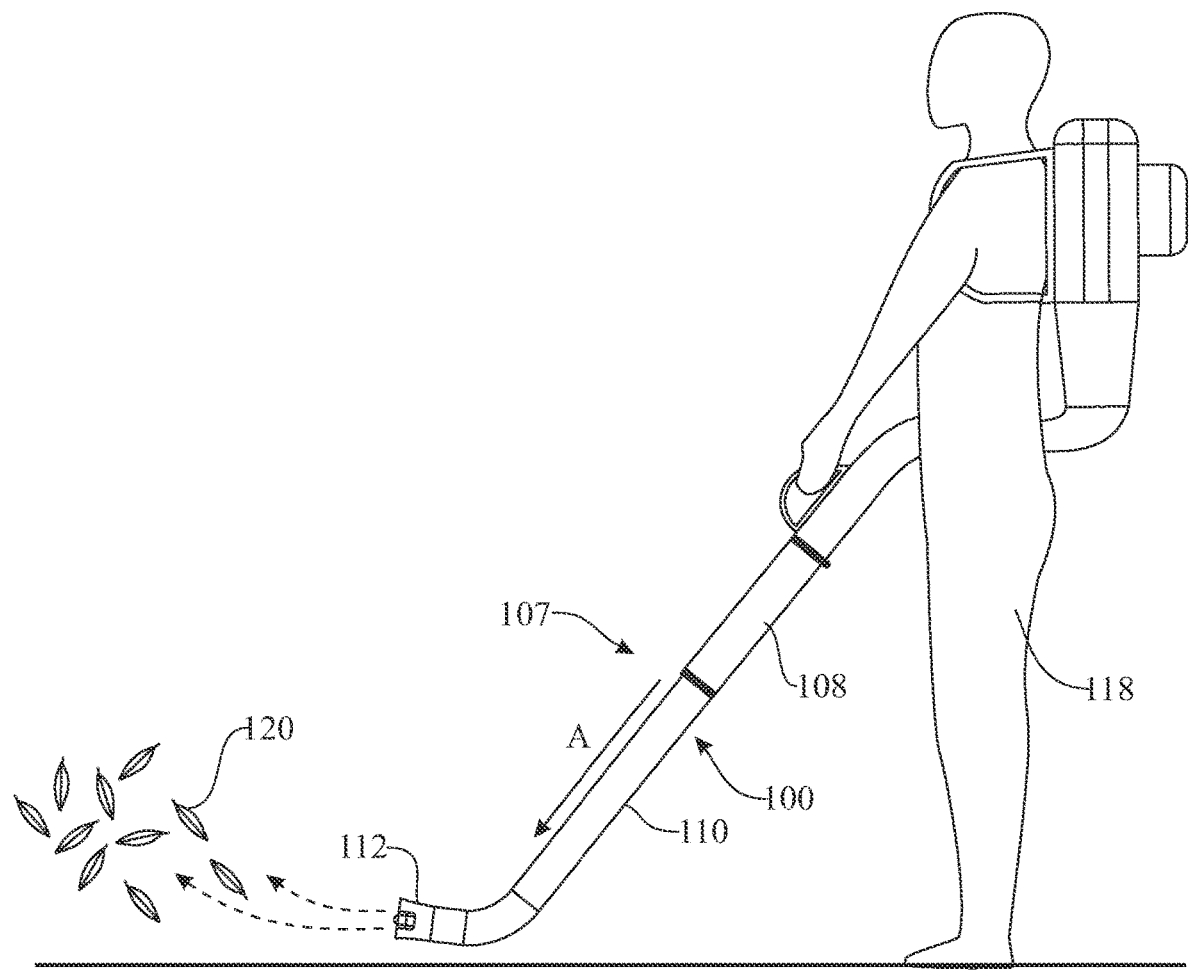
FIG. 7 presents a side elevation view of an operator wearing and using a backpack-style power air blower fitted with an attachment system in accordance with an illustrative embodiment of the present invention to blow debris from a ground surface.

The elongated tube 108 and the bent or curved tune assembly 109 are telescopically adjustable relative to one another, as shown in FIGS. 6 and 7 and indicated with arrow A. To ensure locking, a pipe clamp 114b may be used to fix the relative telescopic positions of the elongated tube 108 and the bent or curved tune assembly 109. In some embodiments comprising a pipe clamp 114b, providing ribs or protrusions 144 and indentations 140 on the mating portions may enhance the securement in all situations.

In some embodiments, the bent or curved tube portion 110 and the nozzle 112 of the bent or curved tube assembly 109 may be a one-piece, unitary structure. Alternatively, the bent or curved tube portion 110 and the nozzle 112 may be separate pieces that are assembled together (e.g., adhesives, rivets, screws, etc.).

The materials used to construct the attachment system 107 of the present invention are not particularly limited. Some degree of rigidity may be necessary to ensure proper blower operability, but the parts may be made of various materials, such as, cured or uncured elastomeric materials, molded opaque or transparent polymeric or plastic materials, light metallic materials (e.g., light aluminum sheet material), or the like.

As shown in FIGS. 1-3 and 5-7 (particularly FIG. 5), the attachment system 107 may be provided with a light-emitting device 116 on either side of the nozzle 112. As shown in FIG. 3, the light-emitting device 116 may be configured to emit light 117. In preferred embodiments, as shown, the light-emitting device 116 may be oriented to direct the light 117 towards an area arranged frontward or distally of the nozzle opening 136. The light 117 emitted by the light-emitting device 116 may allow the blowing operation to be conducted even in low-light conditions (e.g., twilight) or nighttime. In a non-limiting example, the light-emitting device 116 may include an LED light device.

The illustration of FIG. 4 shows how the air inlet end 108a of the elongated tube 108 and the air outlet end 106a of the air outlet 106 of the present embodiment are connected together (see arrow B), as well as how the air outlet end 108b of the elongated tube 108 and the air inlet end 110a of the bent or curved tube portion 110 of the present embodiment are connected together (see arrow C). In addition, FIG. 4 shows that the elongated tube 108 can be rotated about its longitudinal axis (which is arranged along the axial direction 132) with respect to the bent or curved tube portion 110, as indicated by arrow D, to facilitate engagement of the ribs or protrusions 144 with the indentations 142 and/or to adjust the orientation of the nozzle 112 with respect to the elongated tube 108.

Figure 5:
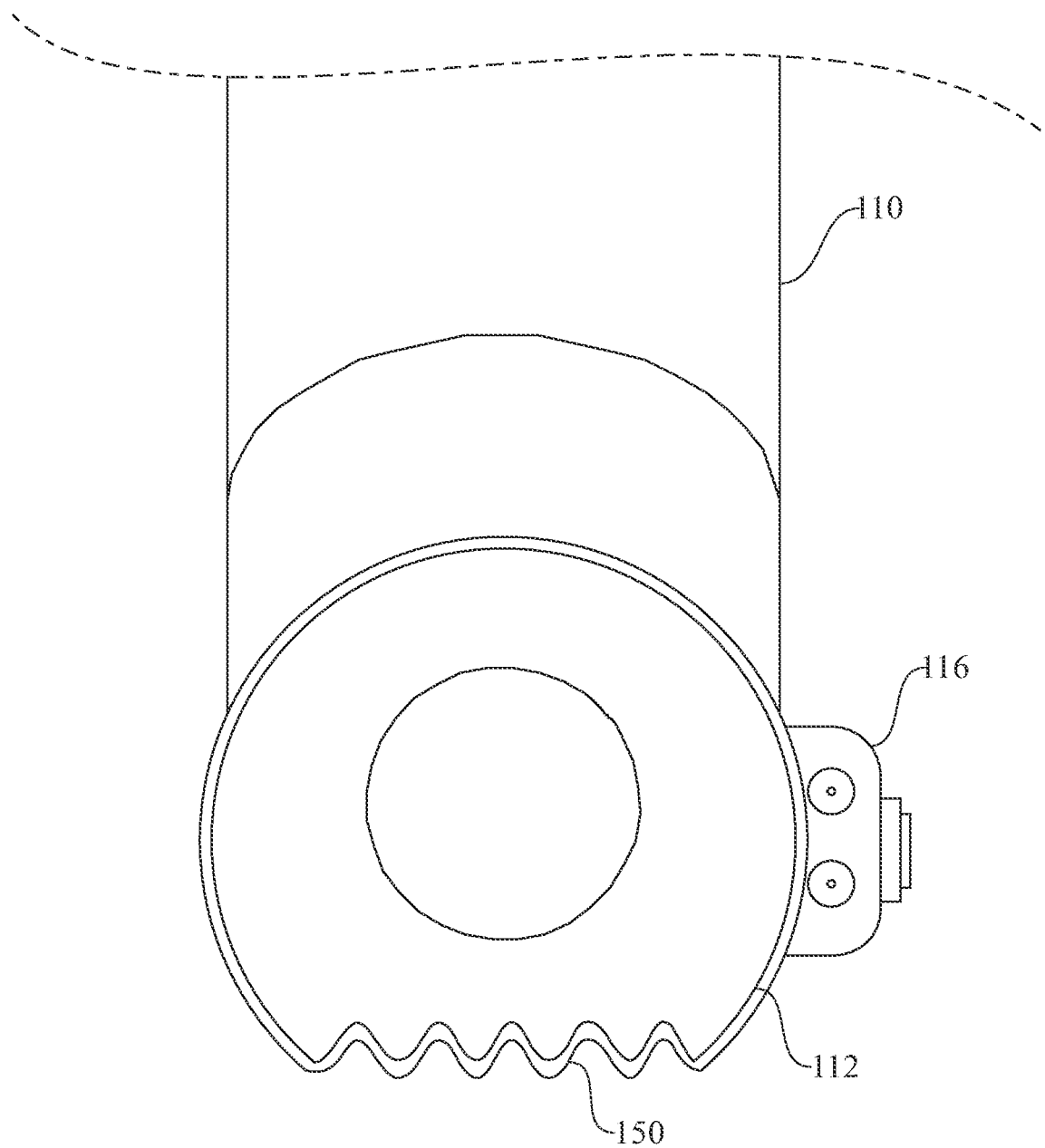
FIG. 5 presents an enlarged, partial front elevation view of the bent or curved tube assembly, more particularly illustrating the opening of the nozzle piece of the attachment system shown in FIG. 1.

In some embodiments, as shown for instance in FIGS. 1 and 5, a lower portion of the nozzle 112 configured to face the ground surface may be provided with a ribbing 150 having a serrated or undulated cross-section, which may help in breaking up debris matter.

As depicted in FIGS. 6 and 7, the telescopically adjustable attachment system 107 of the present invention eliminates or reduces the need for an operator 118 to bend his or her back during the blowing/cleanup operation. The illustration of FIG. 6 shows that the versatility of the attachment system 107 of the present invention is such that it can be implemented universally for a variety of blowers including hand-held blowers (FIG. 6) as well as backpack-style blowers (FIG. 7). Therefore, the attachment system 107 of the present disclosure may serve to retrofit many different blowers in the market.

Finally, although not depicted in the figures, it is within the scope of the present invention to provide a belt accessory that is provided with a loop to engage with and help carry the power air blower 100 on either side of the operator.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An attachment system for a power air blower, comprising:

an elongated tube, comprising an air inlet end and an air outlet end in fluid communication with one another through the elongated tube, wherein the air inlet end of the elongated tube is configured to attach to an air outlet of a power air blower; and a bent or curved tube, comprising an air inlet end and an air outlet end in fluid communication with one another through the bent or curved tube, wherein the air inlet end of the bent or curved tube is attachable to the air outlet end of the elongated tube, and further wherein the air outlet end of the bent or curved tube is configured to direct a stream of air outward of the bent or curved tube; wherein the attachment system is configured to adopt a working configuration in which the air inlet end of the elongated tube is attached to the air outlet of the power air blower and the air inlet end of the bent or curved tube is attached to the air outlet end of the elongated tube, wherein fluid communication is provided from the air outlet of the power air blower to the air outlet end of the bent or curved tube through the elongated tube and the bent or curved tube, and further in which a separation between the bent or curved tube and the air outlet of the power air blower is selectively adjustable, wherein the bent or curved tube comprises a nozzle having a bottom side configured to face a ground surface during operation of the power air blower, the bottom side including a wave-shaped serrated ribbing integrally and continuously formed on an outer surface of the nozzle along the length of the bottom side, wherein the attachment system in the working configuration provides the stream of air outward adjacent to the ground surface, wherein the air outlet end of the bent or curved tube is formed along an axial direction, and further wherein, in the working configuration of the attachment system, the axial direction of the air outlet end of the bent or curved tube is arranged at an angle greater than 90 degrees and less than 180 degrees with an axial direction of the air outlet of the power air blower, and wherein the elongated tube comprises a plurality of protrusions disposed at preset lengths on an outer surface of the elongated tube, wherein the bent or curved tube comprises a plurality of indentations disposed at preset lengths on an inner surface of the bent or curved tube, the plurality of indentations configured to engage with the plurality of protrusions to lock the bent or curved tube to the elongate tube at said different positions, and wherein the bent or curved tube is telescopically attachable to the elongated tube, and further wherein, in the working configuration of the attachment system, the bent or curved tube and elongated tube are telescopically adjustable relative to one another, by virtue of the plurality of protrusions and the plurality of indentations, to selectively adjust the separation between the bent or curved tube and the air outlet of the power air blower, and wherein the elongated tube and the bent or curved tube are further fixed at relative telescopic positions by a pipe clamp.

2. The attachment system of claim 1, wherein the elongated tube is generally straight.

3. The attachment system of claim 2, wherein the elongated tube is formed along a first axial direction and the air outlet end of the bent or curved tube is formed along a second axial direction, wherein, in the working configuration of the attachment system, the second axial direction forms an angle greater than 90 degrees and less than 180 degrees with the first axial direction.

4. The attachment system of claim 3, wherein, in the working configuration of the attachment system, the first axial direction of the elongated tube is arranged parallel to the axial direction of the air outlet of the power air blower.

5. The attachment system of claim 4, wherein, in the working configuration of the attachment system, the first axial direction of the elongated tube is same as the axial direction of the air outlet of the power air blower.

6. The attachment system of claim 1, wherein the bent or curved tube is selectively lockable to the elongated tube in different positions relative to one another to adjust the air outlet end at respective, different separations from the air outlet of the power air blower.

7. The attachment system of claim 1, wherein, in the working configuration of the attachment system, the power air blower and attachment system are positionable by a user standing on the ground surface, the user normally operating the power air blower to direct the stream of air near adjacent to the ground surface, such that an axial direction of the air outlet end of the bent or curved tube forms an angle of about 15 degrees with the ground surface.

8. The attachment system of claim 1, wherein the nozzle provides said air outlet end of the bent or curved tube.

9. The attachment system of claim 1, wherein the nozzle is flared.

10. The attachment system of claim 1, wherein the air outlet end of the bent or curved tube is flared.

11. The attachment system of claim 1, further comprising at least one light emitter configured to emit light towards an area in front of the air outlet end of the bent or curved tube.

12. The attachment system of claim 11, wherein the at least one light emitter is comprised in the bent or curved tube.

13. The attachment system of claim 1, wherein the elongated tube is more flexible than the bent or curved tube.

14. An attachment system for a power air blower, comprising:

a generally straight, elongated tube formed along a first axial direction, the elongated tube comprising an air inlet end and an air outlet end in fluid communication with one another through the elongated tube, wherein the air inlet end of the elongated tube is configured to attach to an air outlet of a power air blower, and a bent or curved tube, comprising an air inlet end and an air outlet end in fluid communication with one another through the bent or curved tube, wherein the air inlet end of the bent or curved tube is attachable to the air outlet end of the elongated tube, and further wherein the air outlet end of the bent or curved tube is formed along a second axial direction and configured to direct a stream of air outward of the bent or curved tube; wherein the attachment system is configured to adopt a working configuration in which the air inlet end of the elongated tube is attached to the air outlet of the power air blower and the air inlet end of the bent or curved tube is attached to the air outlet end of the elongated tube, wherein fluid communication is provided from the air outlet of the power air blower to the air outlet end of the bent or curved tube through the elongated tube and the bent or curved tube, and further in which a separation between the bent or curved tube and the air outlet of the power air blower is selectively adjustable, and further in which the elongated tube is coaxial with the air outlet of the power air blower and the second axial direction of air outlet end of the bent or curved tube forms an angle greater than 90 degrees and less than 180 degrees with the first axial direction of the elongated tube, wherein the bent or curved tube comprises a nozzle having a bottom side configured to face a ground surface during operation of the power air blower, the bottom side including a wave-shaped serrated ribbing integrally and continuously formed on an outer surface of the nozzle along the length of the bottom side, wherein the attachment system in the working configuration provides the stream of air outward adjacent to the ground surface, wherein the elongated tube comprises a plurality of protrusions disposed at preset lengths on an outer surface of the elongated tube, wherein the bent or curved tube comprises a plurality of indentations disposed at preset lengths on an inner surface of the bent or curved tube, the plurality of indentations configured to engage with the plurality of protrusions to lock the bent or curved tube to the elongate tube at said different positions, and wherein the bent or curved tube is telescopically attachable to the elongated tube, and further wherein, in the working configuration of the attachment system, the bent or curved tube and elongated tube are telescopically adjustable relative to one another, by virtue of the plurality of protrusions and the plurality of indentations, to selectively adjust the separation between the bent or curved tube and the air outlet of the power air blower, and wherein the elongated tube and the bent or curved tube are further fixed at relative telescopic positions by a pipe clamp.

* * * * *